Oct. 7, 1941.  R. L. MULLANEY  2,258,465
SLACK TAKE-UP DEVICE
Filed May 6, 1940
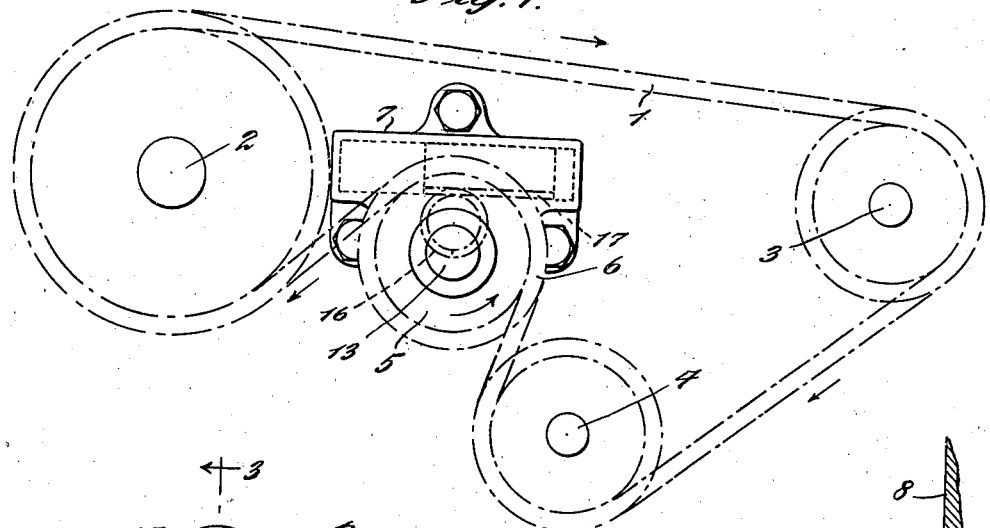
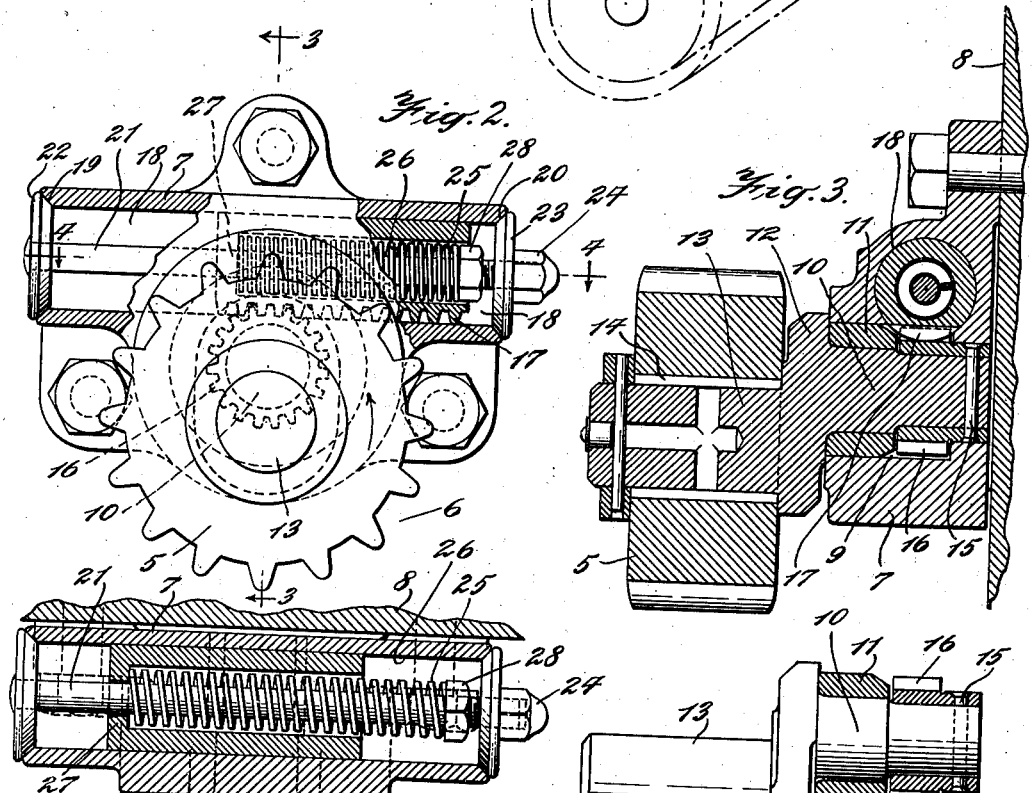
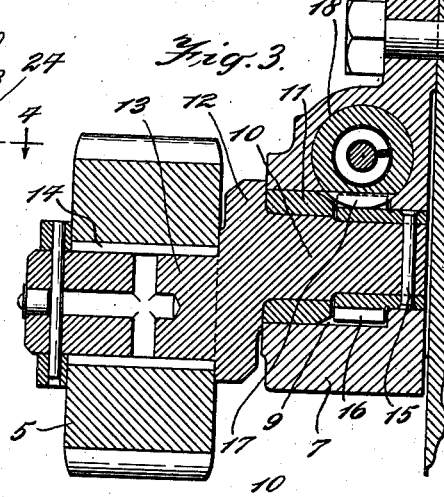
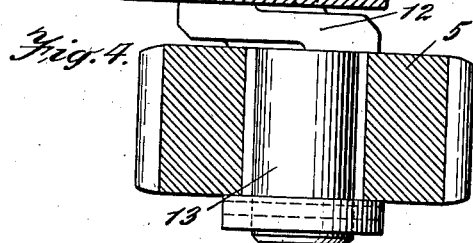
INVENTOR.
Richard L. Mullaney
BY
Gifford, Scull & Burgess
ATTORNEYS Patented Oct. 7, 1941

2,258,465

UNITED STATES PATENT OFFICE 2,258,465

SLACK TAKE-UP DEVICE

Richard L. Mullaney, West Hartford, Conn., assignor to The Whitney Chain & Mfg. Company, Hartford, Conn., a corporation of Connecticut Application May 6, 1940, Serial No. 333,477

4 Claims. (Cl. 74—242.11)

This invention relates to a novel and improved form of slack take-up device, the novel features of which will be best understood from the following description and the annexed drawing, in which I have shown a selected embodiment of the invention and in which:

Fig. 1 is a diagrammatic view of a chain drive having my invention employed therewith;

Fig. 2 is a face view of a take-up device, parts being broken away and parts shown in section;

Fig. 3 is a section approximately on the line 3—3 of Fig. 2;

Fig. 4 is a view approximately on the line 4—4 of Fig. 2, but showing the shaft turned from the position which it occupies in Fig. 1;

Fig. 5 is a view showing the shaft, bearing, and pinion detached from the other parts.

Referring first to Fig. 1, I have shown therein a chain drive, such for example as is used in the operation of timing mechanism in an automobile. The invention finds particular utility in such drives and, for the sake of convenience, I shall assume that it is a chain in which the slack is to be taken up by the device, although it will be understood that the device may be used with a belt or other drive wherever found desirable.

In Fig. 1, the chain 1 is shown as engaging sprockets on three shafts 2, 3, and 4, and the take-up device is shown as having a sprocket or other idler 5 engaging in a bight or loop 6 of the chain. Of course, where a belt is used, the sprocket will be replaced by a roller adapted to engage a belt.

The take-up device comprises a body 7 which may be secured by bolts or otherwise to any fixed part 8 of the machine with which the device is used. That body is shown as provided with a bore 9 in which is rotatably mounted a shaft 10 supported on suitable bearings, here shown as a bushing 11.

The front end of the shaft, by which is meant the end which projects from the body, is provided with an arm 12 which extends transversely of the shaft and which is in the nature of a crank arm. On the arm 12 and parallel to but off-set from the shaft 10 is a bearing 13, which is preferably integral with the arm 12 and shaft 10. This bearing is shown as being cylindrical, but may be conical or any other suitable form, a cylindrical bearing being selected merely for purpose of illustration. Not only is the bearing eccentric to the shaft 10, but is bodily offset therefrom.

The sprocket 5 is mounted on the bearing 13 and is freely rotatable thereon. For example, anti-friction bearings 14 may be used between the bearing 13 and the sprocket if desired, so as to give a free rotation to the sprocket.

Secured to the shaft 10, as by a pin 15, is a pinion 16 which engages with a rack 17 which is slidable in a chamber 18 of the body 7. This chamber, as is best shown in Figs. 2 and 4, extends from end to end of the body at approximately right angles to the shaft 10, and its opposite ends are open and provided with duplicate seats 19 and 20.

Extending lengthwise through the chamber 18 is a rod 21 which is secured at one end to a closure 22 which is adapted to seat against either the seat 19 or the seat 20 so as to close the chamber. At its other end the rod is threaded, as indicated in Figs. 2 and 4, and over that threaded end is slid or, if desired, is threaded a second closure 23 which likewise is adapted to seat against either the seat 19 or the seat 20. Preferably, I merely slide the closure 23 over the threaded end of the rod and then secure it in place by means of the nut 24 which will draw the two closures together to force them against their respective seats.

The rod 21, as shown, passes through the body of the rack 17, and disposed in a bore 25 within that body is a spring 26 which bears against an abutment 27 on the rack and against a nut 28 which is threaded on the rod 21 so that the force of the spring may be adjusted.

In operation, the device is placed in such position with relation to the bight of the chain that the sprocket will engage the chain in that bight. The spring is charged, in this instance being placed under compression, and the device is so placed that the spring tends to rotate the shaft and thus force the sprocket 5 into the bight of the chain and keep the chain tight. As the chain wears or the size of the bight increases for any reason, the slack is automatically taken up by the action of the spring. For example, assuming that the device, as it is shown in Fig. 2 is placed within the bight, then it will be seen that as slack occurs, the shaft will be rotated in a counterclockwise direction (as shown by arrows in Figs. 1 and 4) and cause the slack to be taken up. In Fig. 4, the parts are shown where a quarter revolution of the shaft has taken place, which will bring the sprocket upwardly (in Figs. 1 and 2) and thus take up any slack which has occurred in the chain.

If it is desired to reverse the direction of rotation of the shaft, then the nut 24 may be removed which will permit sliding of the entire rack and rod out of the chamber 18 and then it may be turned end for end and thus tend to cause rotation of the shaft 10 in the opposite direction. The construction of the rack and associated parts is extremely simple for assembly and for placing in either one of the two positions possible for it to take.

The take-up device of this application is designed as an improvement on the device shown in the patent to Richard F. Dow, No. 2,196,255, granted April 9, 1940. It will be seen that I have eliminated the necessity for a large eccentric bearing for the sprocket, and in fact a smaller sprocket or idler is thus made possible. At the same time, the slack will be controlled by the rack and pinion as in said Dow patent, but the rack is embodied in a unit which can be more readily removed and reversed when desired. Other advantages will suggest themselves to those skilled in the art.

While I have shown the invention as embodied in a specific form, it is to be understood that various changes in details may be made without departing from the scope of the invention as defined by the appended claims.

I claim:

1. In a slack take-up device, a rotatable shaft, an arm on one end of said shaft and extending transversely thereof, a bearing rigid with said arm and parallel to said shaft but offset therefrom, an idler freely rotatable on said bearing on the center lien of said idler, a pinion secured to said shaft, a slidable rack engaging said pinion, and a spring urging said rack in one direction to rotate said shaft in one direction.

2. In a slack take-up device having a rotatable shaft and an idler eccentrically supported thereon, a pinion secured to said shaft, a rack engaging said pinion and disposed in an elongated chamber having its two opposite ends open and provided with closure seats, a rod extending through said chamber, a nut threaded on said rod, an abutment on said rack, a spring acting between said nut and abutment to move said rack, a closure for one end of the chamber and fixed to one end of the rod, a second closure for the other end of the chamber and slidable over the other end of the rod, and a nut threaded on said last-named end, to clamp both closures against said seats.

3. In a slack take-up device having a rotatable shaft and an idler eccentrically supported thereon, a pinion secured to said shaft, a rack engaging said pinion and disposed in an elongated chamber having its two opposite ends open and provided with closure seats, a rod extending through said chamber, a nut threaded on said rod, an abutment on said rack, a spring acting between said nut and abutment to move said rack, a closure for one end of the chamber and fixed to one end of the rod, a second closure for the other end of the chamber and slidable over the other end of the rod, and a nut threaded on said last-named end, to clamp both closures against said seats, said closures and seats being respectively duplicates of each other.

4. In a slack take-up device, a rotatable shaft, an arm on one end of said shaft and extending transversely thereof, a bearing rigid with said arm and parallel to said shaft but offset therefrom, an idler freely rotatable on said bearing on the center line of said idler, a pinion secured to said shaft, a slidable rack engaging said pinion, and a compression spring urging said rack in a direction to rotate said shaft in that direction tending to give said idler the maximum take-up effect.

RICHARD L. MULLANEY.